(12) United States Patent
Kojima et al.

(10) Patent No.: US 8,298,121 B2
(45) Date of Patent: Oct. 30, 2012

(54) LOCK-UP CLUTCH CONTROL APPARATUS

(75) Inventors: Sei Kojima, Okazaki (JP); Daisuke Inoue, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 470 days.

(21) Appl. No.: 12/452,041

(22) PCT Filed: Jun. 20, 2008

(86) PCT No.: PCT/JP2008/001608
§ 371 (c)(1),
(2), (4) Date: Dec. 14, 2009

(87) PCT Pub. No.: WO2009/001536
PCT Pub. Date: Dec. 31, 2008

(65) Prior Publication Data
US 2010/0137100 A1    Jun. 3, 2010

(30) Foreign Application Priority Data
Jun. 22, 2007   (JP) .................................. 2007-164887

(51) Int. Cl.
*F16H 45/02*    (2006.01)
*F16H 61/14*    (2006.01)
*B60W 10/02*    (2006.01)
*B60W 10/04*    (2006.01)

(52) U.S. Cl. ......... 477/174; 477/169; 477/175; 477/180

(58) Field of Classification Search .................. 477/174, 477/168, 169, 175, 180
See application file for complete search history.

(56) References Cited

U.S. PATENT DOCUMENTS

| | | | |
|---|---|---|---|
| 5,947,865 A * | 9/1999 | Watanabe et al. | 477/169 |
| 6,503,169 B2 | 1/2003 | Nakano et al. | |
| 2010/0210412 A1 * | 8/2010 | Kojima et al. | 477/38 |

FOREIGN PATENT DOCUMENTS

| | | |
|---|---|---|
| JP | A-7-217713 | 8/1995 |
| JP | A-10-26220 | 1/1998 |
| JP | A-10-68462 | 3/1998 |
| JP | A-2004-124969 | 4/2004 |

OTHER PUBLICATIONS

International Search Report mailed on Oct. 19, 2009 in corresponding International Application No. PCT/JP2008/001608.

Written Opinion of the International Searching Authority mailed on Oct. 19, 2009 in corresponding International Application No. PCT/JP2008/001608.

* cited by examiner

*Primary Examiner* — Tisha Lewis
(74) *Attorney, Agent, or Firm* — Oliff & Berridge, PLC

(57) ABSTRACT

In one embodiment, when a condition (specifically, brake ON) of rising of a source pressure (line pressure) of a lock-up control valve is satisfied during deceleration lock-up control, a lock-up differential pressure instruction value is corrected to a low side with that source-pressure rising amount taken into consideration.

6 Claims, 7 Drawing Sheets

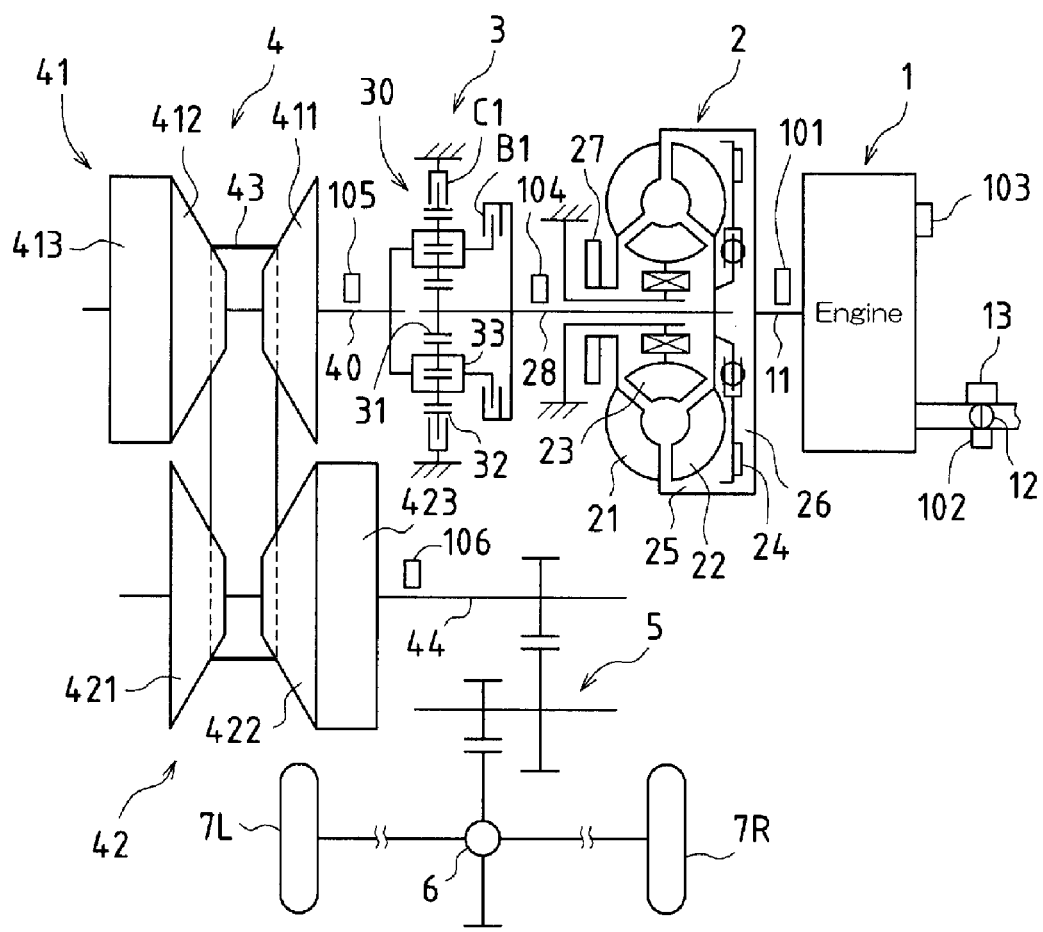
[Fig. 1]

[Fig. 2]
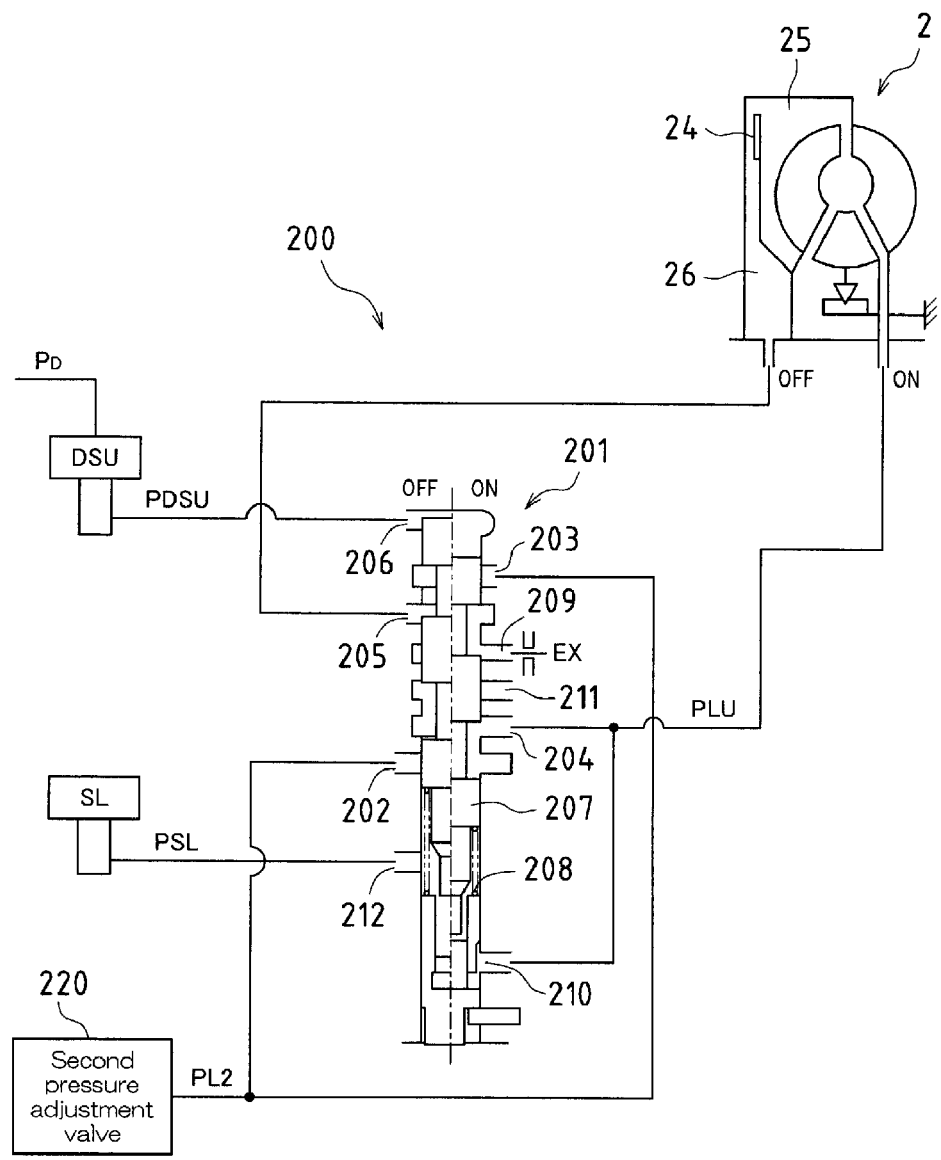

[Fig. 3]
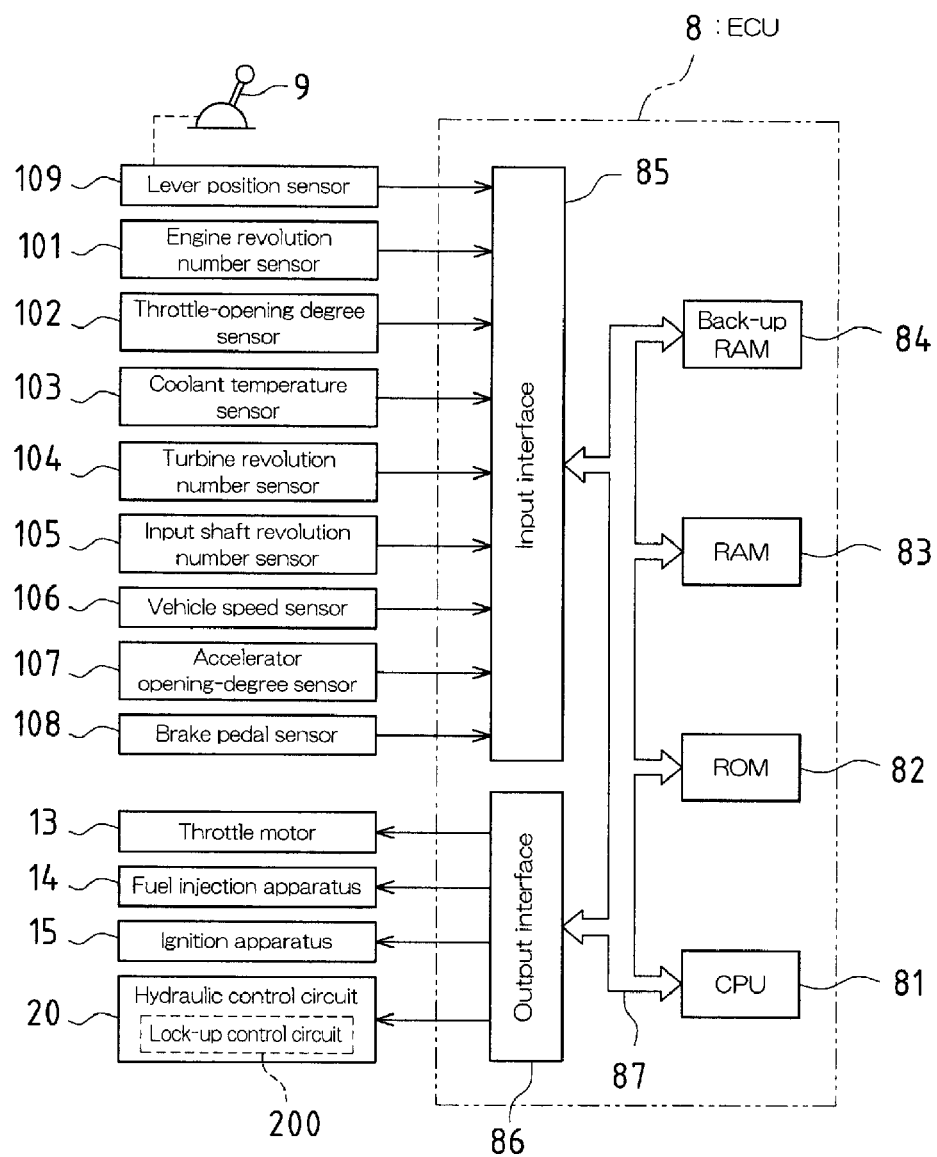

[Fig. 4]
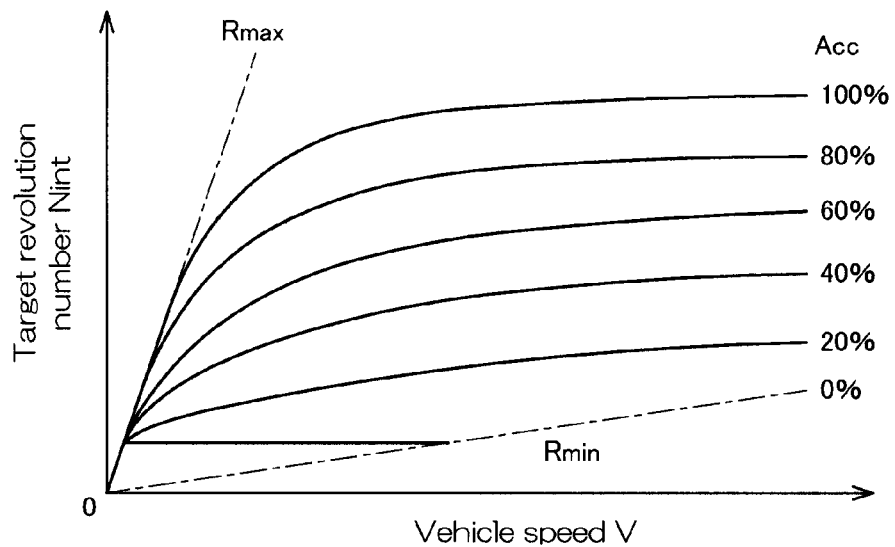
[Fig. 5]
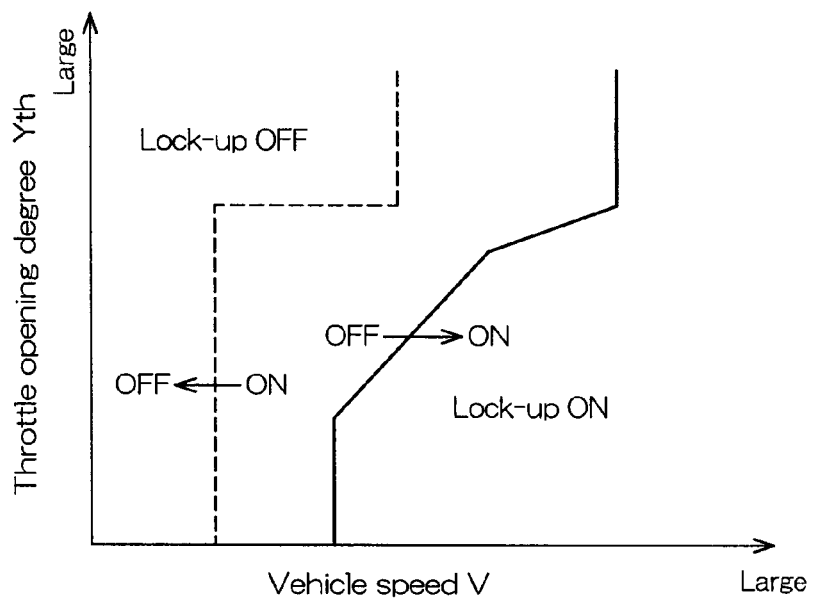

[Fig. 6]
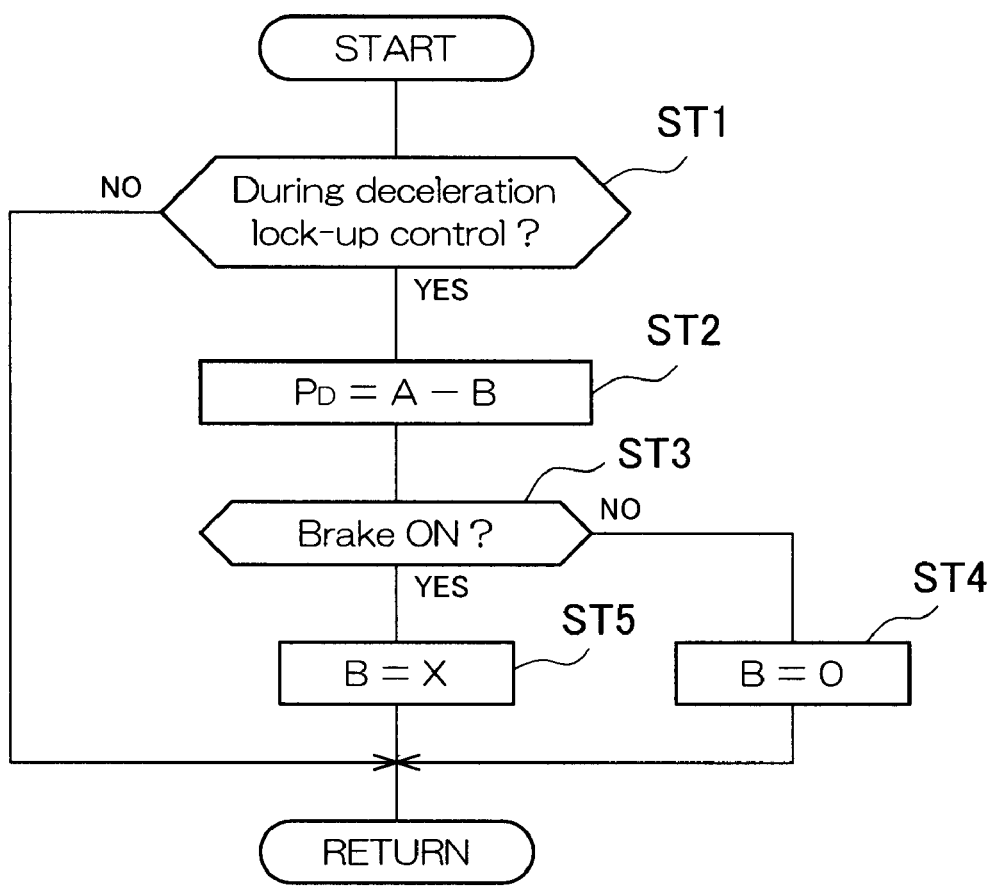

LOCK-UP CLUTCH CONTROL APPARATUS

TECHNICAL FIELD

The present invention relates to a lock-up clutch control apparatus, and more specifically, it relates to a lock-up clutch control apparatus controlling a lock-up differential pressure by using a line pressure of a hydraulic control system, including hydraulic control of an automatic transmission, as a source pressure.

BACKGROUND ART

In a vehicle whereupon an engine (internal combustion engine) is mounted, an automatic transmission automatically and optimally setting a gear ratio between the engine and drive wheels is known as a transmission for suitably transmitting torque and revolution speed generated by the engine to the drive wheels in accordance with a driving condition of the vehicle.

For example, a planetary gear type transmission setting a gear ratio (gear position) using a clutch, a brake, and a planetary gear apparatus, and a belt-type continuously variable transmission (CVT) performing stepless adjustment of a gear ratio exist as an automatic transmission mounted in a vehicle.

A belt-type continuously variable transmission has a belt wound around a primary pulley (input-side pulley) and a secondary pulley (output-side pulley) having a pulley groove (V-groove) and is configured such that a gear ratio is set in a stepless fashion by simultaneously expanding a groove width of the pulley groove of one of the pulleys and contracting a groove width of the pulley grove of the other pulley so as to continuously vary a winding radius (effective diameter) of the belt with respect to each of the pulleys. A torque transmitted in this belt-type continuously variable transmission is a torque corresponding to a load acting in a direction in which the belt and the pulleys are made to contact mutually, and therefore, in order to apply tension to the belt, the belt is clamped by the pulleys.

Furthermore, as explained above, a speed change is carried out in a belt-type continuously variable transmission by expanding and contracting the groove widths of the pulley grooves. Specifically, each of the primary pulley and the secondary pulley comprises a fixed sheave and a moveable sheave, and a speed change is carried out by moving the moveable sheave forwards and backwards in an axial direction using a hydraulic actuator provided at a rear face side thereof.

In this way, in a belt-type continuously variable transmission, the belt is clamped by the pulleys in order to apply tension to the belt, and in addition, the condition of clamping of the belt by the pulleys is changed in order to carry out a speed change. Accordingly, the groove width of the primary pulley and the groove width of the secondary pulley are simultaneously changed by delivering hydraulic pressure corresponding to a required torque as typified by engine load, etc. to the hydraulic actuator at the secondary pulley side so as to secure a necessary transmission torque capacity and by delivering hydraulic pressure for carrying out a speed change to the hydraulic actuator at the primary pulley side.

Furthermore, in a vehicle whereupon an automatic transmission is mounted, a fluid-type transmission apparatus such as a fluid coupling or torque converter, etc. is disposed between the engine and the automatic transmission. A fluid-type transmission apparatus provided with a lock-up clutch directly connecting an input side and an output side of the fluid-type transmission apparatus through frictional engagement using a hydraulic pressure of an operating oil exists as a fluid-type transmission apparatus.

Furthermore, in a vehicle whereupon this type of fluid-type transmission apparatus featuring a lock-up clutch is mounted, engagement and disengagement of the lock-up clutch is performed by controlling a hydraulic pressure made to act on the lock-up clutch with a hydraulic pressure (line pressure) of a hydraulic control system including hydraulic control of an automatic transmission used as a source pressure (for example, see patent documents 1 and 2). Specifically, in a case of a torque converter featuring a lock-up clutch, control of engagement and disengagement of the lock-up clutch is performed by controlling a differential pressure (lock-up differential pressure) between an engagement-side pressure chamber and a disengagement-side pressure chamber of the torque converter with a lock-up control valve using a line pressure as a source pressure.

Furthermore, in certain cases in the control of a lock-up clutch, deceleration lock-up control to control engagement of the lock-up clutch is performed upon deceleration with the accelerator off. With deceleration lock-up control of this type, in order to prevent stalling of the engine in a case of, for example, sudden braking of a vehicle, etc., it is possible to rapidly disengage the lock-up clutch by maintaining engagement of the lock-up clutch with the lowest possible hydraulic pressure (low-pressure engagement pressure within a range where slipping does not occur).

Patent Citation 1: JP H10-068462A
Patent Citation 2: JP H10-026220A
Patent Citation 3: JP H07-217713A

DISCLOSURE OF INVENTION

Technical Problem

Incidentally, in the above-explained lock-up clutch control, as control of the lock-up differential pressure is performed with a lock-up control valve using the line pressure as the source pressure, the lock-up differential pressure is dependent on the line pressure. The line pressure varies in accordance with a driving condition of the vehicle or an operation condition of the engine, and in certain cases, the line pressure becomes higher as a result of operation conditions. Furthermore, when the line pressure becomes higher and the source pressure of the lock-up control valve becomes higher, the lock-up differential pressure rises due to an effect thereof.

Meanwhile, although engagement of the lock-up clutch is maintained with a low-pressure engagement pressure during deceleration lock-up control in order that the lock-up clutch can be rapidly disengaged as explained above, if the source pressure (line pressure) of the lock-up control valve becomes higher for the above-explained reason during this deceleration lock-up control, disengagement of the lock-up clutch is delayed and the occurrence of engine stalling becomes a concern. Hereinafter, this point is explained in concrete terms.

First of all, in a case where the automatic transmission is a belt-type continuously variable transmission, in order to prevent slipping of the belt when a brake becomes ON during deceleration of the vehicle (during deceleration lock-up control), control is carried out to increase the hydraulic pressure and increase the belt clamping force. In specific terms, the line pressure of the hydraulic control system is increased, the hydraulic pressure of the hydraulic actuator of the secondary pulley side of the belt-type continuously variable transmission is increased, and the belt clamping force is raised. However, as the source pressure of the lock-up control valve also rises when the line pressure is increased, as shown in FIG. 8(a) to FIG. 8(c), when a brake turns on during deceleration lock-up control, the actual lock-up differential pressure increases and becomes larger than a lock-up differential pressure instruction value $P_D$. As disengagement of the lock-up clutch is delayed during sudden braking if the actual lock-up differential pressure increases in this way during deceleration lock-up control, reduction of resistance to engine stalling becomes a concern.

Furthermore, in a vehicle whereupon a belt-type continuously variable transmission is mounted, the gear ratio of the belt-type continuously variable transmission changes to a low-speed side (the gear ratio changes to a large side) upon decelerating and stopping and a situation wherein belt slippage can easily occur develops, and as a result, there are cases wherein the line pressure of the hydraulic control system is made higher and the belt clamping force is raised, but as the source pressure of the lock-up control valve also rises when the line pressure becomes higher, reduction of resistance to engine stalling becomes a concern in this case also.

It should be noted that, as a technology related to line-pressure variation in the control of a lock-up clutch, the above-mentioned patent document 1 describes the adjustment of a command value concerning a fastening force in order to counteract changes in the actual slippage amount due to the effect of, for example, dropping of the line pressure pursuant to switching of an oil channel when a speed change occurs, rising of the line pressure pursuant to rapid charging control at an initial stage of a speed change, and increases and decreases in the line pressure as a result of line-pressure feedback control during a speed change. Furthermore, the patent document 2 describes controlling of the actual amount of slippage to a target value, even if the engine load varies during slip control of the lock-up clutch, by suppressing changes in the source pressure of a slip control valve.

However, no mention of control of the lock-up differential pressure during deceleration lock-up control is made in these patent documents 1 and 2, and even if the technologies described in the patent documents 1 and 2 are used, the above-explained problems cannot be resolved.

It is an object of the present invention to provide a technology capable of assuring resistance to engine stalling by, in a lock-up clutch control apparatus performing deceleration lock-up control to control engagement of the lock-up clutch during deceleration of the vehicle, suppressing increases in the actual lock-up differential pressure during deceleration lock-up control.

Technical Solution

The present invention is a lock-up clutch control apparatus for a vehicle whereupon a motive power source, an automatic transmission, a fluid power transmission apparatus provided between the motive power source and the automatic transmission, and a lock-up clutch directly connecting an input side and an output side of the fluid power transmission apparatus are mounted, the lock-up clutch control apparatus including: a control unit for performing deceleration lock-up control to control engagement of the lock-up clutch upon deceleration of the vehicle and for outputting a lock-up differential pressure instruction value; and a lock-up differential pressure control portion (for example, a lock-up control valve, etc.) for controlling a lock-up differential pressure of the lock-up clutch in accordance with the lock-up differential pressure instruction value by using a line pressure of a hydraulic control system including hydraulic control of the automatic transmission as a source pressure, with the control unit correcting the lock-up differential pressure instruction value to a low side when a condition of rising of the source pressure of the lock-up differential pressure control portion is satisfied during the deceleration lock-up control.

According to this configuration, when a condition of rising of the source pressure (line pressure) of the lock-up differential pressure control portion is satisfied during the deceleration lock-up control, the lock-up differential pressure instruction value is corrected to a low side, and therefore, rising of the actual lock-up differential pressure can be suppressed even when the source pressure rises. As a result of this, for example, even if the brake becomes ON during the deceleration lock-up control and the source pressure rises, the actual lock-up differential pressure can be maintained at a target pressure (low-pressure engagement pressure) suitable for deceleration lock-up control and rapid disengagement of the lock-up clutch becomes possible during sudden braking.

In the present invention, the control unit may consider an amount of source-pressure rising occurring when a condition of rising of the source pressure (line pressure) is satisfied during the deceleration lock-up control and correct the lock-up differential pressure instruction value so as to cancel out that source-pressure rising amount. Specifically, the amount of hydraulic-pressure rising of the source pressure (line pressure) rising when the brake becomes ON during the deceleration lock-up control can be determined in advance through testing and calculation, etc. and the amount of rising of the actual lock-up differential pressure pursuant to rising of the source pressure can be cancelled out by correcting the lock-up differential pressure instruction value with that hydraulic-pressure rising amount taken into consideration, and therefore, the actual lock-up differential pressure can be appropriately controlled to the target pressure.

In a case where an automatic transmission mounted upon a vehicle is a belt-type continuously variable transmission with a belt wound around an output-side pulley and an input-side pulley having a groove width changeable by a hydraulic actuator and performing a speed change by changing the groove width of the input-side pulley using the hydraulic actuator, a configuration wherein the control unit corrects the lock-up differential pressure instruction value to a low side when a condition (specifically, a brake ON condition) of a belt clamping force becoming higher is satisfied during the deceleration lock-up control can be identified as a specific configuration of the present invention.

According to this configuration, for example, even if the brake becomes ON during the deceleration lock-up control and the line pressure (source pressure) is set high in order to raise the belt clamping force of the belt-type continuously variable transmission, regardless of this, the actual lock-up differential pressure (engagement pressure) of the lock-up clutch can be maintained at a target pressure (low-pressure engagement pressure) suitable for deceleration lock-up control and rapid disengagement of the lock-up clutch becomes possible during sudden braking.

Advantageous Effects

According to the present invention, when a condition of rising of the source pressure of the lock-up differential pressure control portion is satisfied during the deceleration lock-up control, the lock-up differential pressure instruction value is corrected to a low side, and therefore, rising of the actual lock-up differential pressure can be suppressed even when the source pressure rises. As a result of this, for example, when there is sudden braking of the vehicle during the deceleration lock-up control, it is possible to rapidly perform disengagement of the lock-up clutch and resistance to engine stalling can be assured.

BRIEF DESCRIPTION OF THE DRAWINGS

FIG. 1 is a schematic configuration diagram of a vehicle to which the present invention is applied.

FIG. 2 is a circuit configuration diagram of a lock-up control circuit performing engagement and disengagement control of a lock-up clutch.

FIG. 3 is a block diagram showing a configuration of a control system of an ECU, etc.

FIG. 4 is a view showing an example of a speed-change map used in speed-change control of a belt-type continuously variable transmission.

FIG. 5 is a view showing an example of a lock-up switching map.

FIG. 6 is a flowchart showing an example of lock-up differential pressure control during deceleration lock-up control.

EXPLANATION OF REFERENCE

Figure 7A:
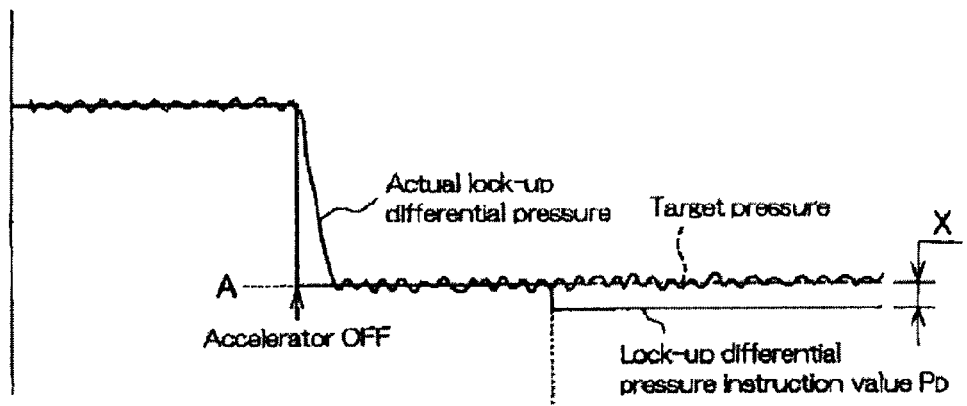
FIG. 7(a) to FIG. 7(c) are timing charts showing an example of lock-up differential pressure control during deceleration lock-up control.
Figure 7B:
Figure 7C:

1 Engine (motive power source)
2 Torque converter (fluid power transmission apparatus)
20 Hydraulic control circuit
24 Lock-up clutch
25 Engagement-side oil chamber
26 Disengagement-side oil chamber
4 Belt-type continuously variable transmission (automatic transmission)
8 ECU (control unit)
108 Brake pedal sensor
200 Lock-up control circuit
201 Lock-up control valve (lock-up differential pressure control portion)

BEST MODE FOR CARRYING OUT THE INVENTION

The following is a description of embodiments of the present invention, with reference to the drawings.

FIG. 1 is a schematic configuration diagram of a vehicle to which the present invention is applied.

The vehicle of this example is an FF (front-engine, front-drive) type vehicle whereupon an engine (internal combustion engine) 1 constituting a motive power source for driving, a torque converter 2 as a fluid power transmission apparatus, a forward-reverse switching apparatus 3, a belt-type continuously variable transmission (CVT) 4, a deceleration gear apparatus 5, a differential gear apparatus 6, and an ECU (Electronic Control Unit) 8 (see FIG. 3) etc., are mounted, and a lock-up control apparatus is realized by that ECU 8 and a lock-up control circuit 200 (hydraulic control circuit 20) described hereinafter.

A crankshaft 11 constituting an output shaft of the engine 1 is connected to the torque converter 2, and an output of the engine 1 is transmitted from the torque converter 2 to the differential gear apparatus 6 via the forward-reverse switching apparatus 3, the belt-type continuously variable transmission 4, and the deceleration gear apparatus 5 and is delivered to left and right drive wheels 7L, 7R.

The engine 1, the torque converter 2, the forward-reverse switching apparatus 3, the belt-type continuously variable transmission 4, and various sections of the ECU 8 are described hereinafter.

—Engine—

The engine 1 is, for example, a multiple cylinder gasoline engine. A volume of intake air drawn into the engine 1 is adjusted by an electronic-control type throttle valve 12. The throttle valve 12 is capable of electronically controlling a degree of throttle opening independent of an accelerator-pedal operation by a driver, and that degree of opening (throttle-opening degree) is detected by a throttle-opening degree sensor 102. Furthermore, a temperature of a coolant of the engine 1 is detected by a coolant temperature sensor 103.

The throttle-opening degree of the throttle valve 12 is drive-controlled by the ECU 8. In specific terms, the throttle-opening degree of the throttle valve 12 is controlled so as to acquire the optimum intake air volume (target air-intake volume) in accordance with an engine revolution number NE detected by an engine revolution number sensor 101, a degree of accelerator-pedal depression by the driver (accelerator operation amount Acc), and other operation conditions of the engine 1. In more specific terms, the actual throttle-opening degree of the throttle valve 12 is detected using the throttle-opening degree sensor 102, and a throttle motor 13 of the throttle valve 12 is feedback controlled in such a way that that actual throttle-opening degree matches the throttle-opening degree (target throttle-opening degree) at which the above-mentioned target air-intake volume is acquired.

—Torque Converter—

The torque converter 2 is provided with an input-side pump impeller 21, an output-side turbine runner 22, and a stator 23 manifesting torque amplification functionality, etc., and performs transmission of motive power between the pump impeller 21 and the turbine runner 22 via a fluid. The pump impeller 21 is connected to the crankshaft 11 of the engine 1. The turbine runner 22 is connected to the forward-reverse switching apparatus 3 via a turbine shaft 28.

The torque converter 2 is provided with a lock-up clutch 24 directly connecting the input side and the output side thereof. The lock-up clutch 24 can be fully engaged, semi-engaged (engagement in a slip condition), or disengaged by controlling a differential pressure (lock-up differential pressure) dP between a hydraulic pressure within an engagement-side oil chamber 25 and a hydraulic pressure within a disengagement-side oil chamber 26 (dP=hydraulic pressure $P_{ON}$ within engagement-side oil chamber 25−hydraulic pressure $P_{ON}$ within disengagement-side oil chamber 26).

The pump impeller 21 and the turbine runner 22 rotate integrally as a result of the lock-up clutch 24 being set to the fully engaged condition. Furthermore, as a result of the lock-up clutch 24 being engaged in a prescribed slip condition (semi-engaged condition), the turbine runner 22 rotates behind the pump impeller 21 with a prescribed amount of slip during driving. Meanwhile, the lock-up clutch 24 is set to a disengaged condition by making the lock-up differential pressure dP negative. It should be noted that the torque converter 2 is provided with a mechanical-type oil pump (hydraulic pressure source) 27 driven through connection with the pump impeller 21.

—Forward-Reverse Switching Apparatus—

The forward-reverse switching apparatus 3 is provided with a double-pinion type planetary gear mechanism 30, a forward-travel clutch (input clutch) C1, and a reverse-travel brake B1.

A sun gear 31 of the planetary gear mechanism 30 is integrally connected with the turbine shaft 28 of the torque converter 2, and a carrier 33 is integrally connected with an input shaft 40 of the belt-type continuously variable transmission 4. Furthermore, this carrier 33 and sun gear 31 are selectively connected via the forward-travel clutch C1, and a ring gear 32 is selectively fixed to a housing via the reverse-travel brake B1.

The forward-travel clutch C1 and the reverse-travel brake B1 comprise hydraulic-type friction engagement elements engaged and disengaged by a hydraulic control circuit 20 described hereinafter. As a result of the forward-travel clutch C1 being engaged and the reverse-travel brake B1 being disengaged, the forward-reverse switching apparatus 3 adopts an integral rotation condition and a forward-travel drive transmission channel is established (achieved); and in this condition, drive force in a forward-travel direction is transmitted to the belt-type continuously variable transmission 4 side.

Meanwhile, as a result of the reverse-travel brake B1 being engaged and the forward-travel clutch C1 being disengaged, a reverse-travel drive transmission channel is established (achieved) by the forward-reverse switching apparatus 3. In this condition, the input shaft 40 rotates in an opposite direction to the turbine shaft 28, and this drive force in a reverse-travel direction is transmitted to the belt-type continuously variable transmission 4 side. Furthermore, when the forward-travel clutch C1 and the reverse-travel brake B1 are both disengaged, the forward-reverse switching apparatus 3 becomes a neutral (cutoff condition) cutting off transmission of motive power.

—Belt-Type Continuously Variable Transmission—

The belt-type continuously variable transmission 4 comprises an input-side primary pulley 41, an output-side secondary pulley 42, and a metal belt 43 wound around the primary pulley 41 and the secondary pulley 42, etc.

The primary pulley 41 is a variable pulley having a variable effective diameter and comprising a fixed sheave 411 fixed to the input shaft 40 and a moveable sheave 412 provided in a condition so as to be capable of sliding only in an axial direction of the input shaft 40. Similarly, the secondary pulley 42 is also a variable pulley having a variable effective diameter and comprising a fixed sheave 421 fixed to an output shaft 44 and a moveable sheave 422 provided in a condition so as to be capable of sliding only in an axial direction of the output shaft 44.

A hydraulic actuator 413 is disposed at the moveable sheave 412 side of the primary pulley 41 in order to change a V-groove width between the fixed sheave 411 and the moveable sheave 412. Furthermore, a hydraulic actuator 423 is similarly disposed also at the moveable sheave 422 side of the secondary pulley 42 in order to change a V-groove width between the fixed sheave 421 and the moveable sheave 422.

As a result of controlling a hydraulic pressure of the hydraulic actuator 413 of the primary pulley 41 in the belt-type continuously variable transmission 4 of the above-described configuration, the V-groove widths of each of the primary pulley 41 and the secondary pulley 42 vary, a winding diameter (effective diameter) of the belt 43 changes, and the gear ratio R (gear ratio R=input shaft revolution number Nin/output shaft revolution number Nout) continuously changes. Furthermore, the hydraulic pressure of the hydraulic actuator 423 of the secondary pulley 42 is controlled such that the belt 43 is clamped with a prescribed clamping pressure whereat belt slipping does not occur. These controls are executed by the ECU 8 and the hydraulic control circuit 20 (see FIG. 3).

The hydraulic control circuit 20 is provided with a linear solenoid valve and an on-off solenoid valve, etc., and by controlling excitation and non-excitation of those solenoid valves and switching a hydraulic channel, speed-change control of the belt-type continuously variable transmission 4 and engagement-disengagement control of the lock-up clutch 24, etc. are carried out. Excitation and non-excitation of the linear solenoid valve and the on-off solenoid valve of the hydraulic control circuit 20 are controlled using a solenoid control signal (instruction hydraulic-pressure signal) from the ECU 8.

—Lock-Up Control Circuit—

Next, an example of the lock-up control circuit 200 of the hydraulic control circuit 20 controlling engagement and disengagement of the lock-up clutch 24 is explained by reference to FIG. 2.

The lock-up control circuit 200 of this example is provided with a lock-up control valve 201, a second pressure adjustment valve 220, a lock-up differential-pressure control solenoid valve DSU, and a lock-up solenoid valve SL, etc.

The lock-up control valve 201 is provided with a first line pressure port 202 and a second line pressure port 203 as a pair, and furthermore, is provided with an engagement-side port 204, a disengagement-side port 205, and a signal pressure port 206. A source pressure PL2 is provided to the first line pressure port 202 and the second line pressure port 203 from the second pressure adjustment valve 220. The second pressure adjustment valve 220 adjusts a control pressure (line pressure) within the hydraulic control circuit 20 (see FIG. 3) and provides the control pressure to the lock-up control valve 201. Accordingly, the source pressure PL2 of the lock-up control valve 201 is dependent on the line pressure and is affected by line pressure variations.

The engagement-side port 204 and the disengagement-side port 205 of the lock-up control valve 201 are connected to the engagement-side oil chamber 25 and the disengagement-side oil chamber 26 of the torque converter 2, respectively. Furthermore, the lock-up control valve 201 comprises a feedback chamber 210 provided with a lock-up engagement hydraulic pressure PLU.

The lock-up differential-pressure control solenoid valve DSU is a linear solenoid valve outputting a control signal pressure PDSU when in excitation state and stopping output of the control signal pressure PDSU when in a non-excitation state. Duty control of the excitation current of the lock-up differential-pressure control solenoid valve DSU is performed in accordance with the lock-up differential pressure instruction value $P_D$ output from the ECU 8, and the control signal pressure PDSU is continuously varied. The control signal pressure PDSU output from the lock-up differential-pressure control solenoid valve DSU is provided to the signal pressure port 206 of the lock-up control valve 201.

In the above-described lock-up control circuit 200, the lock-up differential-pressure control solenoid valve DSU adopts an excitation state in accordance with the lock-up differential pressure instruction value $P_D$ output from the ECU 8, and when the resultant control signal pressure PDSU thereof is provided to the signal pressure port 206 of the lock-up control valve 201, as shown in a half on the right side of a centerline in FIG. 2, a spool 207 of the lock-up control valve 201 adopts a condition (ON condition) of having moved in a downward direction against an urging force of a compression coil spring 208 and the first line pressure port 202 and the engagement-side port 204 communicate. As a result of this, the lock-up engagement hydraulic pressure PLU is provided to the engagement-side oil chamber 25 and the disengagement-side port 205 communicates with a drain port 209, and therefore, an operating oil inside the disengagement-side oil chamber 26 is drained and the lock-up clutch 24 engages (ON).

Furthermore, as the lock-up engagement hydraulic pressure PLU is provided to the feedback chamber 210 of the lock-up control valve 201, the spool 207 moves such that that lock-up engagement hydraulic pressure PLU is balanced with the control signal pressure PDSU. As a result of this, continuous control of the differential pressure dP (lock-up differential pressure dP) between the hydraulic pressure $P_{OFF}$ inside the disengagement-side oil chamber 26 and the hydraulic pressure $P_{ON}$ inside the engagement-side oil chamber 25 of the lock-up clutch 24 in accordance with the control signal pressure PDSU, or in other words, the lock-up differential pressure instruction value $P_D$ becomes possible, and continuous variation of an engagement torque, or in other words, an engagement force, of the lock-up clutch 24 in accordance with that lock-up differential pressure dP becomes possible.

Meanwhile, when the lock-up differential-pressure control solenoid valve DSU adopts a state of non-excitation and output of the control signal pressure PDSU from the lock-up differential-pressure control solenoid valve DSU stops, the lock-up control valve 201 adopts a condition (OFF condition) wherein, as shown in a half on the left side of the centerline in FIG. 2, the spool 207 has moved in an upward direction to an original position due to the urging force of the compression coil spring 208.

In this OFF condition, the second line pressure port 203 and the disengagement-side port 205 communicate, the source pressure PL2 is provided to the disengagement-side oil chamber 26 of the lock-up clutch 24, and in addition, the engagement-side port 204 communicates with a discharge port 211. As a result of this, the operating oil inside the engagement-side oil chamber 25 of the lock-up clutch 24 is discharged from the discharge port 211, and the lock-up clutch 24 adopts a disengaged (OFF) condition. The operating oil discharged from the discharge port 211 can, although not shown in the figure, return to an oil pan, etc. via an oil cooler, and the operating oil can be cooled by that oil cooler. It should be noted that excess operating oil is returned to the oil pan, etc. from a cooler bypass valve.

Here, the lock-up control valve 201 is provided with a back-up port 212. An output hydraulic pressure PSL of the lock-up solenoid valve SL is provided to this back-up port 212. When the hydraulic pressure PSL from the lock-up solenoid valve SL is provided to the back-up port 212, the lock-up control valve 201 is, regardless of provision of the control signal pressure PDSU to the signal pressure port 206 of the lock-up control valve 201, maintained in the OFF condition and the lock-up clutch 24 is forcibly disengaged.

The lock-up solenoid valve SL is an on-off solenoid valve, and by outputting the hydraulic pressure PSL at, for example, times of low vehicle speed such as when moving off or stopping, etc., engagement of the lock-up clutch 24 and engine stalling as a result of ON fail, etc. of the lock-up differential-pressure control solenoid valve DSU can be prevented.

—ECU—

The ECU 8 is, as shown in FIG. 3, provided with, for example, a CPU 81, a ROM 82, a RAM 83, and a back-up RAM 84.

Various types of control program and maps, etc. referenced upon execution of those various types of control program are recorded in the ROM 82. The CPU 81 performs arithmetic processing based on the various types of control program and maps recorded in the ROM 82. Furthermore, the RAM 83 has memory for temporarily recording results of arithmetic operations in the CPU 81 and data input from sensors, etc., and the back-up RAM 84 has non-volatile memory for recording data of the engine 1 to be stored upon stopping thereof, etc.

This CPU 81, the ROM 82, the RAM 83, and the back-up RAM 84 are mutually connected via a bus 87, and in addition, are connected to an input interface 85 and an output interface 86.

The engine revolution number sensor 101, the throttle-opening degree sensor 102, the coolant temperature sensor 103, a turbine revolution number sensor 104, an input shaft revolution number sensor 105, a vehicle speed sensor 106, an accelerator opening-degree sensor 107, a brake pedal sensor 108, and a lever position sensor 109 detecting a lever position (operating position) of a shift lever 9, etc. are connected to the input interface 85 of the ECU 8, and the output signals of the sensors, in other words, signals indicating a revolution number (engine revolution number) NE of the engine 1, a throttle-opening degree Yth of the throttle valve 12, a coolant water temperature Tw of the engine 1, a revolution number (turbine revolution number) NT of the turbine shaft 28, a revolution number (input shaft revolution number) Nin of the input shaft 40, a vehicle speed V, an operation amount (accelerator opening degree) Acc of an accelerator operation member such as the accelerator pedal, etc., an existence or non-existence (brake ON/OFF) of an operation of a foot brake constituting a normal-use brake, and a lever position (operation position) of the shift lever 9, etc. are provided to the ECU 8. The throttle motor 13, a fuel injection apparatus 14, an ignition apparatus 15, and the hydraulic control circuit 20 (lock-up control circuit 200), etc. are connected to the output interface 86.

Here, of the signals provided to the ECU 8, the turbine revolution number NT matches the input shaft revolution number Nin during forward travel with the forward-travel clutch C1 of the forward-reverse switching apparatus 3 engaged, and the vehicle speed V corresponds to the revolution number (output shaft speed) Nout of the output shaft 44 of the belt-type continuously variable transmission 4. Furthermore, the accelerator operation amount Acc indicates an output requirement amount of the driver.

Furthermore, the shift lever 9 is configured so as to be capable of being selectively operated to positions such as a parking position "P" for parking, a reverse position "R" for reverse travel, a neutral position "N" cutting off the transmission of motive power, a drive position "D" for forward travel, and a manual position "M" at which the gear ratio R of the belt-type continuously variable transmission 4 can be increased or decreased by a manual operation during forward driving, etc.

The manual position "M" is provided with a down-shift position and an up-shift position for increasing and decreasing the gear ratio R or a plurality of range positions, etc. allowing selection of a plurality of speed-change ranges with a different speed-change range upper limit (side at which the gear ratio R is small).

A lever position sensor 109 comprises a plurality of ON-OFF switches, etc. detecting operation of the shift lever 9 to, for example, the parking position "P", the reverse position "R", the neutral position "N", the drive position "D", and the manual position "M", the up-shift position, the down-shift position, or a range position, etc. It should be noted that, in order to change the gear ratio R by a manual operation, a down-shift switch, an up-shift switch, or a lever, etc. can be provided independently of the shift lever 9 on a steering wheel, etc.

Further, based on output signals, etc. from the above-described various sensors, the ECU 8 executes output control of the engine 1, speed-change control of the belt-type continuously variable transmission 4, belt clamping force control, control of engagement and disengagement of the lock-up clutch 24, deceleration lock-up control, and lock-up differential pressure control during the deceleration lock-up control described hereinafter, etc.

Output control of the engine 1 is performed by the throttle motor 13, the fuel injection apparatus 14, the ignition apparatus 15, and the ECU 8, etc. and speed-change control of the belt-type continuously variable transmission 4, belt clamping force control, and control of engagement and disengagement of the lock-up clutch 24 are all carried performed by the hydraulic control circuit 20 (lock-up control circuit 200). This throttle motor 13, the fuel injection apparatus 14, the ignition apparatus 15, and the hydraulic control circuit 20 are controlled by the ECU 8.

In speed-change control of the belt-type continuously variable transmission 4, for example, as shown in FIG. 4, a target revolution number Nint for an input side is calculated from a speed-change map set in advance with the accelerator operation amount Acc, indicating the output requirement amount of the driver, and the vehicle speed V as parameters, and in order that the actual input shaft revolution number Nin matches the target revolution number Nint, speed-change control of the belt-type continuously variable transmission 4 is performed in accordance with a deviation thereof, that is to say, a speed-change control pressure Pbelt is controlled by provision and discharge of operating oil with respect to the hydraulic actuator 413 of the primary pulley 41, and the gear ratio R is continuously varied.

The map of FIG. 4 corresponds to speed-change conditions and is configured to set the target revolution number Nint such that the smaller the vehicle speed V and the larger the accelerator operation amount Acc, the larger the gear ratio R becomes. Furthermore, as the vehicle speed V corresponds to the output shaft revolution number Nout, the target revolution number Nint, constituting a target value for the input shaft revolution number Nin, corresponds to the target gear ratio and is set within a range of the minimum gear ratio Rmin and the maximum gear ratio Rmax of the belt-type continuously variable transmission 4.

In basic control engaging and disengaging the lock-up clutch 24, switching of engagement and disengagement of the lock-up clutch 24 in accordance with the actual throttle-opening degree Yth and vehicle speed V is carried out based on, for example, as shown in FIG. 5, a switching map (switching condition) recorded in advance with the vehicle speed V and the throttle-opening degree Yth corresponding to the input torque as parameters.

The switching map shown in FIG. 5 is set such that an engagement switching line shown by a solid line and a disengagement switching line shown by a dashed line have a prescribed amount of hysteresis. In this switching map shown in FIG. 5, if from a time at which the lock-up clutch 24 is at a disengagement condition (OFF), the vehicle speed V changes towards a high vehicle-speed side or the throttle-opening degree Yth changes towards a low throttle opening-degree side and the engagement switching line is crossed, the lock-up clutch 24 is switched to the engagement condition (ON). Meanwhile, if from a time at which the lock-up clutch 24 is at an engagement condition (ON), the vehicle speed V changes towards a low vehicle-speed side or the throttle-opening degree Yth changes towards a high throttle opening-degree side and the disengagement switching line is crossed, the lock-up clutch 24 is switched to the disengagement condition (OFF).

—Deceleration Lock-Up Control—

When, during deceleration travel, that is to say, during forward travel wherein inertial travel takes place and the accelerator is OFF with the accelerator pedal not being subjected to a depression operation, if a prescribed deceleration lock-up control condition (for example, the throttle-opening degree Yth constitutes an idle opening degree, or the vehicle speed V is within a vehicle speed range set in advance, etc.) has been satisfied, the ECU 8 performs control (deceleration lock-up control) expanding a fuel-cut region (vehicle speed range) wherein provision of fuel to the engine 1 is stopped by controlling engagement of the lock-up clutch 24 to directly transmit reverse input force from the drive wheels 7L, 7R side to an engine 1 side such that the engine revolution number NE is gradually reduced in accordance with deceleration of the vehicle. With deceleration lock-up control of this type, in order to prevent stalling of the engine in a case of, for example, sudden braking of a vehicle, etc., rapid disengagement of the lock-up clutch 24 is made possible by maintaining engagement of the lock-up clutch 24 with the lowest possible hydraulic pressure (low-pressure engagement pressure within a range where slipping does not occur).

—Lock-Up Differential Pressure Control During Deceleration Lock-Up Control—

In engagement-disengagement control of the lock-up clutch 24 as explained above, as the lock-up differential pressure dP is controlled with the line pressure within the hydraulic control circuit 20 as the source pressure PL2, the lock-up differential pressure dP is dependent on the line pressure. However, since the line pressure within the hydraulic control circuit 20 is not constant and changes in accordance with a driving condition of the vehicle or an operation condition of the engine, the following point is a concern.

Figure 8A:
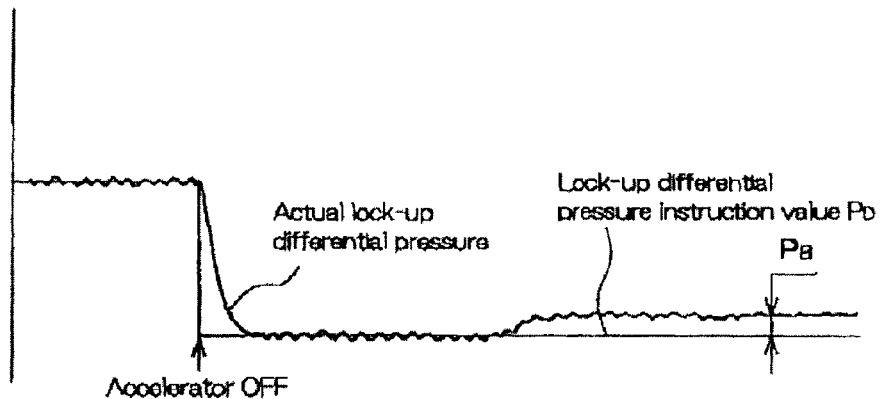
FIG. 8(a) to FIG. 8(c) are timing charts showing an example of conventional lock-up differential pressure control.
Figure 8B:
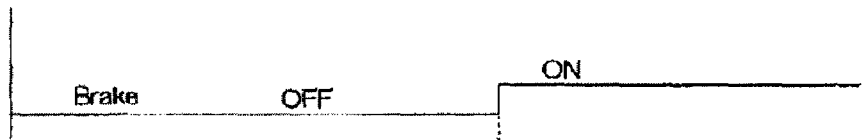
Figure 8C:

First of all, in a vehicle whereupon the belt-type continuously variable transmission 4 is mounted as shown in FIG. 1, in order to prevent slipping of the belt when the brake becomes ON during deceleration of the vehicle, control is carried out to increase the hydraulic pressure and increase the belt clamping force. In specific terms, the line pressure of the hydraulic control circuit 20 is increased, the hydraulic pressure of the hydraulic actuator 423 of the secondary pulley 42 side of the belt-type continuously variable transmission 4 is increased, and the belt clamping force is raised, but when the line pressure becomes higher, the source pressure PL2 of the lock-up control valve 201 also increases. For this reason, when the brake turns on during deceleration lock-up control, as shown in FIG. 8(a) to FIG. 8(c), the actual lock-up differential pressure increases and becomes larger than the lock-up differential pressure instruction value $P_D$. Disengagement of the lock-up clutch 24 is delayed during sudden braking if the actual lock-up differential pressure becomes larger, and reduction of resistance to engine stalling becomes a concern.

In this example, in order to resolve this type of point, upon satisfaction of a condition of rising of the source pressure PL2 of the lock-up control valve 201 during deceleration lock-up control (specifically, when the brake becomes ON), the lock-up differential pressure instruction value $P_D$ of the lock-up clutch 24 is corrected to a low side, and therefore, rising of the actual lock-up differential pressure is suppressed, and the actual lock-up differential pressure is maintained at the target pressure.

An example of that specific control is explained by reference to FIG. 6 and FIG. 7(a) to FIG. 7(c). FIG. 6 is a flowchart showing an example of a control routine of lock-up differential pressure control during deceleration lock-up. This control routine shown in FIG. 6 is executed repeatedly every prescribed interval within the ECU 8.

First of all, in step ST1, it is determined whether or not deceleration lock-up control is underway. In a case where the determination result of step ST1 is a negative judgment, that is to say, a case where deceleration lock-up control is not being performed, this routine is left once. In a case where the determination result of step ST1 is a positive judgment, it proceeds to step ST2.

In step ST2, the lock-up differential pressure instruction value $P_D$ [$P_D$=A-B] is set. Here, [A] as used in processing in this step ST2 is a value corresponding to a target pressure (see FIG. 7(a)) during deceleration lock-up control, and in a case where there is no variation in the source pressure PL2 of the lock-up control valve 201 (when the brake is OFF), the lock-up differential pressure instruction value $P_D$ is set to A. That is to say, [B] of the above-mentioned equation [$P_D$=A-B] is set to 0 (step ST4).

Meanwhile, when the brake becomes ON during deceleration lock-up control, the line pressure of the hydraulic control circuit 20 is set high in order to raise the belt clamping force of the belt-type continuously variable transmission 4, and the source pressure PL2 of the lock-up control valve 201 rises. Even in cases where the source pressure PL2 varies in this way, the lock-up differential pressure instruction value $P_D$ is maintained at an unchanged value in conventional control, and as shown in FIG. 8(a), the actual lock-up differential pressure becomes large and reduced resistance to engine stalling during sudden braking becomes a concern.

In contrast, in this example, when the brake becomes ON during deceleration lock-up control, the lock-up differential pressure instruction value $P_D$ is corrected to a low side (step ST5) with the amount by which the source pressure PL2 rises taken into consideration. Specifically, using a correction value X, correction [$P_D$=A−XX is not equal to 0] is performed with respect to the lock-up differential pressure instruction value $P_D$, and the actual lock-up differential pressure is maintained at the target pressure (low-pressure engagement pressure). It should be noted that the correction value X is set to a value allowing the amount of rising of the actual lock-up differential pressure pursuant to rising of the source pressure to be cancelled based on the results of testing and calculation, etc. of the amount of rising of the actual lock-up differential pressure (for example, $P_B$ shown in FIG. 8(a)) when the brake becomes ON during deceleration lock-up control with the source pressure PL2 (hydraulic pressure to which the line pressure is adjusted by the second pressure adjustment valve 220) of the lock-up control valve 201 and a hydraulic pressure for raising the belt clamping force, etc. taken into consideration.

As explained above, according to this example, when the brake becomes ON during deceleration lock-up control, even when the line pressure (source pressure) is set high in order to raise the belt clamping force of the belt-type continuously variable transmission 4, since the lock-up differential pressure instruction value $P_D$ is corrected to a low side, with consideration given to that amount of increase of line pressure, it is possible to cancel the amount of rising of the actual lock-up differential pressure pursuant to rising of the source pressure of the lock-up control valve 201 and to maintain the actual lock-up differential pressure of the lock-up clutch 24 during deceleration lock-up control at the target pressure (low-pressure engagement pressure). As a result of this, it is possible to rapidly perform disengagement of the lock-up clutch 24 during sudden braking and resistance to engine stalling can be assured.

Other Embodiments

Although correction of the lock-up differential pressure instruction value is performed in the above-explained example when the brake becomes ON during deceleration lock-up control, the present invention is not limited to this.

For example, as the gear ratio of the belt-type continuously variable transmission changes to a low-speed side when the vehicle decelerates or stops as explained above, and pursuant to this, there are cases where the belt clamping force becomes higher and the source pressure increases, in order to suppress the effect of source pressure variation in this type of deceleration/stopping process, the lock-up differential pressure instruction value may be corrected so as to suppress rises in the lock-up differential pressure. Furthermore, without limitation to increases in belt clamping force, even in cases where conditions of rising of source pressure (line pressure) during deceleration lock-up control due to other factors are satisfied, the lock-up differential pressure instruction value may be corrected.

Although the above example shows an example of application of the present invention in lock-up clutch control of a vehicle whereupon a belt-type continuously variable transmission is mounted, the present invention is not limited to this, and application is possible also in lock-up clutch control of a vehicle whereupon a planetary-gear type transmission setting a gear ratio using a clutch, a brake, and a planetary gear apparatus is mounted.

Although the above example shows an example of application of the present invention in lock-up clutch control of a vehicle whereupon a torque converter is mounted as a fluid-type transmission apparatus, the present invention is not limited to this, and application is possible also in lock-up clutch control of a vehicle whereupon a fluid coupling (including a lock-up clutch) is mounted.

Although the above example shows an example of application of the present invention in lock-up clutch control of a vehicle whereupon a gasoline engine is mounted, the present invention is not limited to this, and application is possible also in lock-up clutch control of a vehicle whereupon another engine such as a diesel engine, etc. is mounted.

Furthermore, the motive power source of the vehicle may, other than an engine (internal combustion engine), be an electric motor or a hybrid-type motive power source comprising an engine and an electric motor.

It should be noted that without departure from the spirit or principal characteristics thereof, the present invention can have many other embodiments. Accordingly, the above-described embodiments are no more than mere examples and should not be interpreted in a limited manner. The scope of the present invention is set forth by the scope of the claims, and the disclosure is in no way binding. Furthermore, all modifications and changes within a scope equivalent to that of the claims are within the scope of the present invention.

It should be noted that this application claims priority based on Patent Application No. 2007-164887, which was filed in Japan on Jun. 22, 2007. Accordingly, all of the content thereof is included in this application by reference. Furthermore, all of the content of documentation quoted in this specification is specifically included in this application by reference.

The invention claimed is:

1. A lock-up clutch control apparatus for a vehicle whereupon a motive power source, an automatic transmission, a fluid power transmission apparatus provided between the motive power source and the automatic transmission, and a lock-up clutch directly connecting an input side and an output side of the fluid power transmission apparatus are mounted, the lock-up clutch control apparatus comprising:

a control unit for performing deceleration lock-up control to control engagement of the lock-up clutch upon deceleration of the vehicle and for outputting a lock-up differential pressure instruction value; and a lock-up differential pressure control portion for controlling a lock-up differential pressure of the lock-up clutch in accordance with the lock-up differential pressure instruction value by using a line pressure of a hydraulic control system including hydraulic control of the automatic transmission as a source pressure, wherein the control unit corrects the lock-up differential pressure instruction value to a low side when a condition of rising of the source pressure of the lock-up differential pressure control portion is satisfied during the deceleration lock-up control.

2. The lock-up clutch control apparatus of claim 1, wherein the control unit considers an amount of source-pressure rising occurring when a condition of rising of the source pressure is satisfied during the deceleration lock-up control and corrects the lock-up differential pressure instruction value so as to cancel out that source-pressure rising amount.

3. The lock-up clutch control apparatus of claim 1, wherein:

the automatic transmission is a continuously variable transmission with a belt wound around an output-side pulley and an input-side pulley having a groove width changeable by a hydraulic actuator and performing a speed change by changing the groove width of the input-side pulley using the hydraulic actuator; and the control unit corrects the lock-up differential pressure instruction value to a low side when a condition of a belt clamping force of the continuously variable transmission becoming higher is satisfied during the deceleration lock-up control.

4. The lock-up clutch control apparatus of claim 3, wherein the control unit judges that a condition of the belt clamping force becoming higher is satisfied when a brake becomes ON during the deceleration lock-up control.

5. The lock-up clutch control apparatus of claim 2, wherein:

the automatic transmission is a continuously variable transmission with a belt wound around an output-side pulley and an input-side pulley having a groove width changeable by a hydraulic actuator and performing a speed change by changing the groove width of the input-side pulley using the hydraulic actuator; and the control unit corrects the lock-up differential pressure instruction value to a low side when a condition of a belt clamping force of the continuously variable transmission becoming higher is satisfied during the deceleration lock-up control.

6. The lock-up clutch control apparatus of claim 5, wherein the control unit judges that a condition of the belt clamping force becoming higher is satisfied when a brake becomes ON during the deceleration lock-up control.

* * * * *